July 1, 1958    J. A. DONNER ET AL    2,840,999
FLEXIBLE SHAFT-COUPLING
Filed Aug. 29, 1955

*INVENTORS*
*JOSEF A. DONNER &*
*PAUL A. KÖPKE*
BY *Willard D. Eakin*
ATTORNEY

United States Patent Office 2,840,999
Patented July 1, 1958

2,840,999

FLEXIBLE SHAFT-COUPLING

Josef A. Donner, Dusseldorf, and Paul A. Köpke, Mettmann, Rhineland, Germany

Application August 29, 1955, Serial No. 531,004

Claims priority, application Germany September 3, 1954

5 Claims. (Cl. 64—15)

This invention relates to flexible shaft couplings.

Its chief objects are to provide a coupling adapted to compensate for shaft misalignment in a desirable manner; to provide for transmitting the torque primarily through metal-to-metal contacts; to provide desirable cushioning of the torque with regard to shocks and vibrations; and to provide a vibration-absorbing effect.

Figure 1:
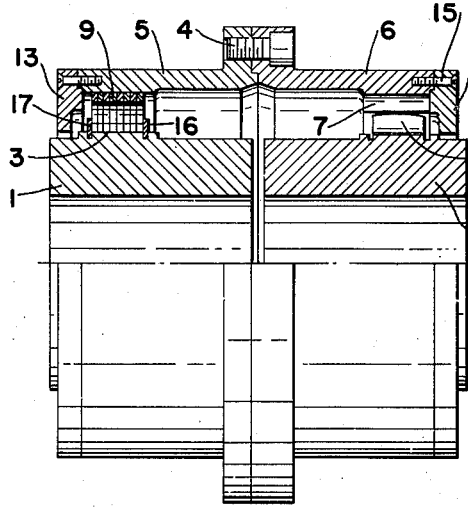
Fig. 1 is a side elevation, partially in axial section, of a coupling embodying the invention in its preferred form.
Figure 2:
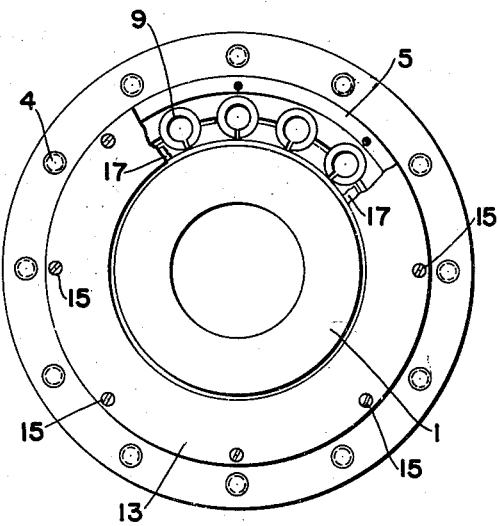
Fig. 2 is an end elevation of the coupling with a part broken away.

As shown in Figs. 1 and 2 the coupling in its preferred form comprises a pair of hubs 1 and 2 adapted to be secured to the adjacent ends of respective shafts. A pair of sleeve-halves 5 and 6 have external flanges on their adjacent ends. The sleeve halves are held together as a single sleeve structure by screws 4, 4, extending through the flanges.

Near its outer end each sleeve half is formed with an internal, axially extensive rib 7. The internal face of each such rib is cylindrical except that it is interrupted by a circumferentially spaced set of approximately semi-cylindrical, axially extending socket grooves; the set of grooves is thus defined by a circumferentially spaced set of torque-transmitting teeth.

Each hub member is externally formed at the axial position of the rib 7 with an axially extensive rib 3. The outer face of the rib 7 is spherical, about a center at the hub member's axis of rotation, except that the said face is interrupted by a circumferentially spaced set of approximately semi-cylindrical socket grooves at the circumferential positions of the respective socket grooves in the internal rib of the adjacent sleeve half; the set of grooves is thus defined by a circumferentially spaced set of torque-transmitting teeth.

At each of the circumferentially spaced positions a substantially cylindrical socket is provided by the mated grooves in the inner and outer members. In each socket is mounted a torque-transmitting and cushioning member or set of members of one or another of the types shown in Figs. 3 to 7.

Figure 3:
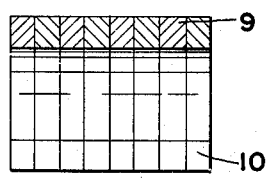
Fig. 3 is an axial section of a torque-transmitting and cushioning assembly of C-shaped rings.
Figure 4:
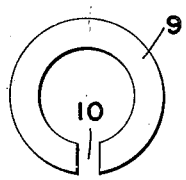
Fig. 4 is an elevation of one of those rings.
Figure 5:
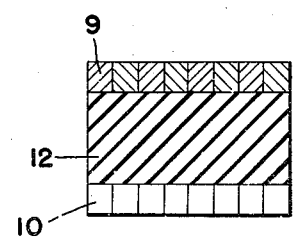
Fig. 5 is an axial section of an alternative type of torque-transmitting and cushioning unit.

In Figs. 3 and 4 the torque-transmitting and cushioning unit consists of a set of spring-metal C-shaped rings, preferably of rectangular cross-section as shown. The rings of the set axially abut one another. As shown in Fig. 5, the modulus of elasticity of the unit can be modified by filling the set of rings with a body of rubber 12 and preferably vulcanizing it in place. The body of rubber provides a desirable absorption of the energy of vibration, as a damping factor.

Figure 6:
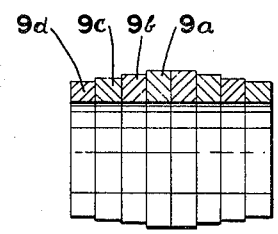
Fig. 6 is an axial section of an alternative torque-transmitting and cushioning assembly of C-shaped rings.

In Fig. 6 the unit consists of a set of axially abutted C-shaped spring metal rings of which the middle one 9ª is of relatively large diameter; the others, each way from it, are of successively less diameter, as illustrated by the rings 9ᵇ, 9ᶜ and 9ᵈ.

Each circumferentially spaced set of units is held in place axially by a pair of snap-rings 16, 17, Fig. 1, mounted in annular grooves in the outer face of the respective hub member.

Closure rings 13, 14, having axial and radial clearance at their inner peripheries, are secured to the outer ends of the respective sleeve halves by screws 15, 15. Axial creep of the sleeve structure is limited by contact of the rib such as the rib 3, Fig. 1, with the adjacent ring 13 or 14.

An advantage of the dual construction here shown is that, by hinging action at the two ends of the sleeve structure, it permits and compensates for axial offset, as well as angular misalignment, of the hub members, even with the curved outer faces of the hub teeth closely fitted to the cylindrical inner faces of the respective sets of teeth in the sleeve. The close fitting of those faces that is permitted by such hinging action supports the respective ends of the sleeve substantially without play or looseness of such support.

Further modifications are possible without departure from the scope of the invention as defined in the appended claims.

We claim:

1. A flexible shaft coupling comprising a hub member externally formed with a circumferentially spaced set of torque-transmitting teeth defining a circumferentially spaced set of socket grooves, a sleeve member internally formed with a circumferentially spaced set of torque-transmitting teeth defining a circumferentially spaced set of socket grooves, each groove of the hub member being at the circumferential position of a groove of the sleeve member and therewith defining a socket, and, mounted in each of the sockets, torque-transmitting and cushioning means comprising a set of C-shaped, transversely split, spring-metal rings all arranged in side-by-side relation to one another, so that the set of rings is in effect a single, laminated unit, but with numerous lamina acting respectively as individual springs.

2. A coupling as defined in claim 1 in which each of the defined units is relatively large in its middle portion and of decreasing outer diameters from said portion toward its ends.

3. A coupling as defined in claim 1 in which each of the defined units comprises, within the defined rings, a body of material having the resilient deformability of vulcanized soft-rubber.

4. A coupling as defined in claim 1 in which the radially outer faces of the teeth of the hub member are curved, in axial planes of the hub member, about a center substantially at said hub member's axis of rotation.

5. A coupling as defined in claim 1 in which the sleeve member is formed with two axially spaced apart sets of the teeth as defined, and the coupling comprises two of the hub members as defined and two sets of the defined units, each of said sets of units being associated as defined with one of the hub members and one of the sleeve member's sets of teeth.

References Cited in the file of this patent

UNITED STATES PATENTS

| | | |
|---|---|---|
| 1,440,847 | Sundh | Jan. 2, 1923 |
| 1,675,065 | Thomas | June 26, 1928 |
| 2,066,223 | Pielstick | Dec. 29, 1936 |
| 2,119,678 | Lindner | June 7, 1938 |

FOREIGN PATENTS

| | | |
|---|---|---|
| 66,327 | Sweden | Dec. 20, 1926 |